United States Patent Office 3,530,095
Patented Sept. 22, 1970

3,530,095
CURABLE MIXTURES OF EPOXIDE RESINS AND CYCLIC UREA DERIVATIVES
Daniel Porret, Binningen, Switzerland, assignor to Ciba Limited, Basel, Switzerland, a company of Switzerland
No Drawing. Filed Mar. 10, 1969, Ser. No. 805,850
Claims priority, application Switzerland, Mar. 19, 1968, 4,034/68
Int. Cl. C08g 30/14
U.S. Cl. 260—47                    9 Claims

ABSTRACT OF THE DISCLOSURE

Hot-curable composition of matter containing a polyglycidyl compound as for example a liquid polyglycidyl ether of bisphenol A, $\Delta^4$-tetrahydrophthalic acid diglycidyl ether or triglycidyl-iso-cyanurate and, as curing agent, ethylene urea (or propylene urea). The curable mixtures are suitable as one package systems owing to their good storage stability. Further advantages of ethylene urea as curing agent are its good compatibility with most epoxide resins and the good electrical properties of the cured shaped articles. Ethylene urea presumably acts as a "latent curing agent" which is only split at the curing temperature (100–180° C.) into the cross-linking component.

---

It is known that epoxide resins cure with polycarboxylic acid anhydrides at elevated temperature to give insoluble crosslinked high molecular products. The cured products are generally distinguished by good chemical and mechanical properties.

Further, the anhydride curing agents as a rule show good compatibility with the epoxide resins so that the manufacture of homogeneous curable mixtures or melts in most cases causes no difficulties. These advantages are on the other hand counterbalanced by various disadvantages.

If what is practically the most important class of epoxide resins, namely the polyglycidyl ethers of polyphenols, such as bisphenol A (2,2-bis(p-hydroxyphenyl)propane) is cured with polycarboxylic acid anhydrides such as for example phthalic anhydride, then the electrical properties and in particular the arcing resistance and tracking resistance of the cured product are insufficient for some technical applications, above all in the field of high voltage technology. The cure as a rule requires high curing temperatures and even then takes place very slowly in many cases. It has therefore been proposed to add cure accelerators and in particular above all tertiary amines. The curable systems accelerated in this way also suffer from various disadvantages: thus the cure time is as a rule several hours even at high cure temperatures in the range of 150–250° C.

A particularly serious disadvantage of the tertiary amines known as accelerators, for example benzyldimethylamine, resides in the poor storage stability of such epoxide resin anhydride curing agent/accelerator mixtures. It is therefore not possible to formulate storage-stable single-component systems such as "prepregs," compression moulding compositions or sintering powders on this basis.

It is furthermore known that on curing epoxide resins with dicyandiamide at elevated temperature cured products are obtained which are not only distinguished by good chemical and mechanical properties but also by excellent electrical properties, and in particular this is also true when using polyglycidyl ethers of polyphenols as epoxide resin components. The cure times are as a rule shorter at comparable cure temperatures than they are for anhydride curing agents.

A further point to be emphasized is the good storage stability of the hot-curable mixtures of epoxide resins and dicyandiamide, which are therefore well suited to so-called "single-component systems" such as sintering powders, compression moulding compositions or "prepregs." On the other hand a serious disadvantage when using dicyandiamide as a curing agent is its high melting point and its poor compatibility with most epoxide resins. This is a priori excludes the use of this curing agent for all technical applications in which homogeneously curable melts or mixtures are required, that is to say in the field of casting resins and impregnating resins.

It has now been found that ethyleneurea surprisingly combines, in itself, the most important advantageous properties of the abovementioned known hot curing agents without showing their disadvantages.

Thus ethyleneurea shows excellent compatibility with most epoxide resins and at elevated temperatures yields homogeneous solutions or melts with these, which can for example be employed as casting or impregnating resins. Curable mixtures of ethyleneurea and epoxide resins furthermore not only show exceptionally good storage stability at room temperature but also slightly elevated temperatures (for example at 60° C.). They are therefore also suitable for use as single-component systems (sintering powders, compression moulding compositions and binders). Such systems are distinguished by their excellent flow properties at the processing temperatures because of the good compatibility of the ethyleneurea. The pot life of such curable mixtures at temperatures of about 80–120° C. is as a rule significantly higher than for the hitherto known hot curing agents for epoxide resins and nevertheless the curing times in the temperature range of about 140–180° C. are, even without the addition of accelerators, of the same order of magnitude as for anhydride curing agents. This is presumably attributable to the fact that ethyleneurea obviously acts as a "latent curing agent" which is only split at higher temperatures into the active component acting as a crosslinking agent. The cured shaped articles are not only distinguished by good chemical and mechanical properties but also above all by good electrical properties, especially by good arcing resistance and tracking resistance, and this is true even if the polyglycidyl ether of a polyphenol such as bisphenol A is employed as the epoxide resin, which when cured with most polycarboxylic acid anhydrides yields shaped articles of low arcing resistance.

Similar properties as a curing agent are also shown by propyleneurea though its compatibility is somewhat less good.

The subject of the present invention are thus storage-stable hot-curable mixtures which are suitable for the manufacture of shaped articles, impregnations, coatings and adhesive bonds and which are characterised in that they contain (a) a polyepoxide compound having an average of more than one glycidyl group or 2,3-epoxycyclopentyl group bonded to a hetero-atom in the molecule; and (b) a cyclic urea derivative of formula

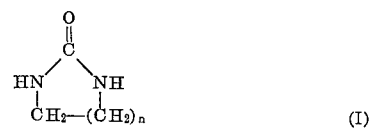

(I)

wherein $n=1$ or 2 as the curing agent.

Ethyleneurea is preferably used as the curing agent. The use of propyleneurea is not quite so favourable for many practical applications because of its high melting point and because of the less good compatibility with many polyglycidyl compounds.

The amount of the cyclic urea derivative (I) or of the ethyleneurea employed as the curing agent can, remarkably, vary within wide limits. In fact excellent results are obtained when using 0.5 to 3.0 equivalents of NH groups of the ethyleneurea per 1 equivalent of epoxide groups of the polyepoxide compound (a). The preferred range is 0.5 to 1.5 equivalents of NH groups of ethyleneurea per 1 equivalent of epoxide groups of the polyepoxide.

As polyepoxide compounds having an average of more than one glycidyl group or 2,3-epoxycyclopentyl group bonded to a hetero-atom (for example sulphur, preferably oxygen or nitrogen) there may in particular be mentioned: bis(2,3-epoxycyclopentyl)ether; diglycidyl or polyglycidyl ethers of polyhyric aliphatic alcohols such as 1,4-butanediol or polyalkylene glycols such as polypropylene glycols; diglycidyl or polyglycidy ethers of cycloaliphatic polyols such as 2,2-bis(4-hydroxycyclohexyl)propane; diglycidyl or polyglycidyl ethers of polyhydric phenols such as resorcinol, bis-(p-hydroxyphenyl)-methane, 2,2-bis(p-hydroxyphenyl)-propane (=bisphenol A), 2,2-bis(4'-hydroxy-3',5'-dibromophenyl)propane, 1,1,2,2-tetrakis(p-hydroxyphenyl)ethane, or of condensation products of phenols with formaldehyde obtained under acid conditions, such as phenolnovolacs and cresolnovolacs.

Polyglycidyl esters of polybasic carboxylic acids such as phthalic acid, terephthalic acid, $\Delta^4$-tetrahydrophthalic acid and hexahydrophthalic acid.

N-glycidyl derivatives of amines, amides and heterocyclic nitrogen bases such as N.N-diglycidyl-aniline, N,N-diglycidyl-toluidine, N.N,N',N'-tetraglycidyl-bis-(p-aminophenyl)-methane; triglycidyl isocyanurate; N,N'-diglycidylethyleneurea; N,N'-diglycidyl-5,5-dimethyl-hydantoin.

If desired, active diluents such as for example styrene oxide, butyl glycidyl ether, isooctyl glycidyl ether, phenyl glycidyl ether, cresyl glycidyl ether, and glycidyl esters of synthetic highly branched mainly tertiary aliphatic monocarboxylic acids ("Cardura E") may be added to the polyepoxides in order to lower the viscosity.

The mixtures according to the invention are preferably cured at 100–180° C. The cure reaction as a rule first takes place relatively slowly and only reaches maximum speed after a long reaction time. This observation allows the supposition that the cure reaction is connected with a ring opening of the alkyleneurea. This fact is important for technical application (above all for the manufacture of larger castings) because the exothermic reaction can be better controlled in this way and a possible disadvantageous overheating of the shaped articles avoided.

In order to shorten the gelling and/or cure times, known basic cure accelerators, for example tertiary amines, quaternary ammonium bases, quaternary ammonium salts, alkali hydroxides or especially alkali alcoholates, for example sodium hexanetriolate, can be added.

The term "cure" as used here denotes the conversion of the soluble, either liquid or fusible, polyepoxide into solid insoluble and infusible three-dimensional crosslnked products or working materials, and in particular as a rule with simultaneous shaping to give shaped articles such as castings, pressings, laminates and the like or "two- dimensional structures" such as coatings, lacquer films or adhesive bonds.

The cure can, if desired, also be effected in two stages by first stopping the cure reaction prematurely and/or effecting the first stage only at a moderately elevated temperature, whereby a curable pre-condensate (so-called "B-stage"), which is still fusible and soluble, is obtained from the epoxide component (a) and the alkyleneurea curing agent (b). Such a pre-condensate as a rule has good storage stability and can for example be employed for the manufacture of "prepregs," compression moulding compositions and sintering powders.

The curable mixtures, according to the invention, of polyepoxide compounds (a) and alkyleneureas of Formula I as curing agents can furthermore, in any stage before cure, be mixed with the usual modifiers such as extenders, fillers and reinforcing agents, pigments, dyestuffs, organic solvents, plasticisers, flow control agents, agents for conferring thixotrophy, flameproofing substances and mould release agents.

As extenders, reinforcing agents, fillers and pigments which can be employed in the curable mixtures according to the invention there may for example be mentioned: coal tar, bitumen, textile fibres, glass fibres, asbestos fibres, boron fibres, carbon fibres, cellulose, polyethylene powder, polypropylene powder; quartz powder, mineral silicates such as mica, asbestos powder and slate powder; kaolin, aluminium oxide trihydrate, chalk powder, gypsum, antimony trioxide, bentones, silica aerogel ("Aerosil"), lithopone, baryte, titanium dioxide, carbon black, graphite, oxide colours, such as iron oxide or metal powders such as aluminium powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures, dibutyl, dioctyl and dinonyl phthalate, tricresyl phosphate, trixylenyl phosphate and also polypropylene glycols can for example be employed.

Silicones, cellulose acetobutyrate, polyvinyl butyral, waxes, stearates and the like (which in part are also employed as mould release agents) can for example be added as flow control agents when employing the curable mixtures, especially for surface protection.

The polyepoxide compounds can furthermore, especially when used in the lacquer field, be partially esterified in a known manner with carboxylic acids such as especially higher unsaturated fatty acids. It is furthermore possible to add other curable synthetic resins, for example phenoplasts or aminoplasts, to such lacquer resin formulations.

The curable mixtures according to the invention can be manufactured in the usual manner with the aid of known mixing equipment (stirrers, kneaders, rollers and the like).

The curable epoxide resin mixtures according to the invention are above all employed in the fields of surface protection, electrotechnology, laminating processes and building. They can be used in a formulation which is in each case suited to the particular end use, in the unfilled or filled state, optionally in the form of solutions or emulsions, as paints, lacquers, compression moulding compositions, dipping resins, casting resins, injection moulding formulations, impregnating resins and adhesives, tool resins, laminating resins, sealing and filling compositions, floor covering compositions and binders for mineral aggregates.

A main field of application lies in the field of binders, compression moulding powders and sintering powders. The epoxide resin powder mixtures can here be processed with or without application of pressure in accordance with known processes such as fluidised bed sintering, electrostatic fluidised bed sintering, spraying, electrostatic spraying, compression moulding and the like.

In the examples which follow, unless otherwise stated, the parts denote parts by weight and the percentages denote percentages by weight. The relationship of parts by volume to parts by weight is as of a millilitre to a gram.

EXAMPLE 1

100 parts of a bisphenol-A-polyglycidyl ether manufactured by condensation of epichlorhydrin with bisphenol A (=2,2-bis(p-hydroxyphenyl)propane) in the presence of alkali, which is liquid at room temperature and has an epoxide content of 5.3 epoxide equivalent/kg. (=epoxide resin A) are warmed to 130° C. and 11.5 parts of ethyleneurea (corresponding to 0.5 equivalents of NH group per 1 epoxide equivalent) are rapidly added, in the course of which the temperature drops to 110° C. and a clear solution of the ethyleneurea in the epoxide resin is obtained. The resulting resin/curing agent mixture is poured into aluminium moulds and first heated for 3 hours at 130° C., whereupon gelling takes place. Thereafter the shaped articles are cured for 16 hours at 160° C. and post-cured for 4 hours at 180° C.

Glass-clear castings having the following properties are obtained:

Flexural strength (VSM 77,103)—12.5 kg./mm.$^2$
Deflection at break (VSM 77,103)—15.4 mm.
Impact strength (VSM 77,105)—21.9 cm.×kg./cm.$^2$
Heat distortion point according to Martens (DIN 53,458)—80° C.
Boiling water absorption after 1 hour—0.83%
Tracking resistance (VDE 0303)—level KA 3 c.
Arcing resistance (VDE 0303)—level L 4.

On curing at 130° C. maximum speed is only achieved after 60 minutes.

If in the above example 67 parts of phthalic anhydride (corresponding to 0.85 mol of anhydride per 1 epoxide equivalent) are used as the curing agent instead of 11.4 parts of ethyleneurea and curing is carried out for 14 hours at 140° C., then castings with the following properties are obtained:

Flexural strength (VSM)—14 kg./mm.$^2$
Impact strength (VSM)—14 cm.×kg./cm.$^2$
Tracking resistance (VDE)—level KA 3 c.
Arcing resistance (VDE)—level L 1.

If in the above example 80 parts of methyl-nadic-anhydride (=methyl-3,6-endomethylene-Δ$^4$ tetrahydrophthalic anhydride) are used as the curing agent instead of 11.4 parts of ethyleneurea and the cure carried out for 24 hours at 160° C., castings with the following properties are obtained:

Flexural strength (VSM)—12 kg./mm.$^2$
Impact strength (VSM)—10 cm.×kg./cm.$^2$
Tracking resistance (VDE)—level KA2
Arcing resistance (VDE)—level L 1

These comparative experiments show that using ethyleneurea as the curing agent moulded substances of better electrical properties, and in particular higher arcing resistance, are obtained than with the anhydride curing agents usual in technology.

EXAMPLE 2

A mixture of 100 parts of epoxide resin and 11.4 parts of ethyleneurea is manufactured exactly as described in Example 1; when the ethyleneurea has dissolved to give a clear solution 0.3 part of a solution of 0.82 part of sodium metal in 100 parts of 3-hydroxymethyl-2,4-dihydroxypentane ("sodium hexanetriolate") are further added as an accelerator. Cured castings are manufactured from the mixture analogously to the procedure described in Example 1 (cure conditions: 2 hours at 120° C.+16 hours at 160° C.).

Castings having the following properties are obtained:

Flexural strength (VSM)—12.9 kg./mm.$^2$
Deflection at break (VSM)—13.0 mm.
Impact strength (VSM)—11.6 cm.×kg./cm.$^2$
Heat distortion point according to Martens (DIN)—78° C.
Boiling water absorption after 1 hour—0.82%

EXAMPLE 3

100 parts of the liquid bisphenol-A-polyglycidyl ether used in Example 1, having an epoxide content of 5.3 epoxide equivalent/kg. (epoxide resin A) are mixed with 22.8 parts of ethyleneurea (corresponding to 1 equivalent of NH group per epoxide equivalent) as described in Example 1 to give a homogeneous melt. Castings are manufactured from the mixture as described in Example 1 (cure conditions: 3 hours at 120° C.+16 hours at 160° C.).

Castings having the following properties are obtained:

Flexural strength (VSM)—14.5 kg./mm.$^2$
Deflection at break (VSM)—12.9 mm.
Impact strength (VSM)—12.1 cm.×kg./cm.$^2$
Heat distortion point according to Martens (DIN)—75° C.
Boiling water absorption after 1 hour—1.33%
Tracking resistance (VDE)—level KA 3 c.
Arcing resistance (VDE)—level L 4

If the above cure cycle is further followed by a post-cure for 4 hours at 180° C., then the castings have the following properties:

Flexural strength (VSM)—15.3 kg./mm.$^2$
Deflection at break (VSM)—14.2 mm.
Impact strength (VSM)—15.0 cm.×kg./cm.$^2$
Heat distortion point according to Martens (DIN)—69° C.
Boiling water absorption after 1 hour—1.42%

EXAMPLE 4

A mixture of 100 parts of epoxide resin A and 22.8 parts of ethyleneurea is manufactured exactly as described in Example 1; when the ethyleneurea has dissolved to give a clear solution, 0.3 part of a solution of 0.82 part of sodium metal in 100 parts of 3-hydroxymethyl-2,4-dihydroxy-pentane are further added as an accelerator. Cured castings are manufactured from the mixture analogously to the procedure described in Example 1 (cure conditions: 2 hours at 120° C.+16 hours at 160° C.).

Castings having the following properties are obtained:

Flexural strength (VSM)—14.6 kg./mm.$^2$
Deflection at break—14.7 mm.
Impact strength (VSM)—18.4 cm.×kg./cm.$^2$
Heat distortion point according to Martens (DIN)—74° C.
Boiling water absorption after 1 hour—1.39%

EXAMPLE 5

100 parts of the liquid bisphenol-A-polyglycidyl ether used in Example 1, having an epoxide content of 5.3 epoxide equivalent/kg. (epoxide resin A) are mixed with 32.2 parts by weight of ethyleneurea (corresponding to 1.5 equivalents of NH group per 1 epoxide equivalent) as described in Example 1 to give a homogeneous melt. The mixture is poured into aluminium moulds, first gelled for 2 hours at 120° C. and then cured for 16 hours at 160° C.

Castings having the following properties are obtained:

Flexural strength (VSM)—13.05 kg./mm.$^2$
Deflection at break (VSM)—8.0 mm.
Impact strength (VSM)—8.8 cm.×kg./cm.$^2$
Heat distortion point according to Martens (DIN)—57.5° C.
Boiling water absorption after 1 hour—1.05%

EXAMPLE 6

100 parts of the bisphenol-A-polyglycidyl ether used in Example 1, which is liquid at room temperature and has an epoxide content of 5.3 epoxide equivalent/kg., are heated to 200° C. and 13.3 parts of propyleneurea (corresponding to 0.5 equivalent of NH group per 1 epoxide equivalent) are rapidly added, in the course of which the temperature drops to about 180° C. When the propyleneurea has dissolved at 180°–190° C., the mixture is poured into aluminium moulds and first cured for 16 hours at 160° C. and then for 18 hours at 180° C. Clear hard and brittle castings are obtained.

EXAMPLE 7

100 parts of Δ$^4$-tetrahydrophthalic acid diglycidyl ester, which is liquid at room temperature and has an epoxide content of 6.4 epoxide equivalent/kg. (=epoxide resin B) are warmed to 150° C. and 28 parts of ethyleneurea (corresponding to 1 equivalent of NH group per 1 epoxide equivalent) are rapidly added, in the course of which the temperature drops to about 120° C. When the ethyleneurea has dissolved at about 120° C., the mixture is cast into aluminium moulds and subjected to the following cure cycle: 6 hours at 120° C. then 1 hour at 130° C., then 1 hour at 140° C., then 16 hours at 160° C. The cured castings are glass-clear and brittle.

EXAMPLE 8

100 parts of triglycidyl isocyanurate having an epoxide content of 9.8 epoxide equivalent/kg. (epoxide resin C) are heated to 130° C. and 21.1 parts of ethyleneurea (corresponding to 0.5 equivalent of NH group per 1 epoxide equivalent) are rapidly added, in the course of which the temperature drops to about 110° C.; when the ethyleneurea has dissolved at 110° C., the mixture is poured into aluminium moulds, first gelled for 10 hours at 100° C., and then cured for 16 hours at 160° C.

Yellowish clear castings of good electrical properties are obtained.

EXAMPLE 9

(Manufacture of a B-stage)

A mixture of 940 parts of the liquid bisphenol-A-polyglycidyl ether used in Example 1, having an epoxide content of 5.3 epoxide equivalents per kg., 107.5 parts of ethyleneurea (corresponding to 0.5 equivalent of NH group per 1 epoxide equivalent) and 0.125 part by volume of 36% strength aqueous sodium hydroxide solution is stirred at 155–165° C. After 1 hour the epoxide content of the reaction mixture has declined to 3.20 epoxide equivalent/kg., after a total of 2 hours to 2.92 epoxide equivalent/kg. and after a total of 2½ hours to 2.62 (theory: 2.71) epoxide equivalent/kg. The reaction is stopped and the substance is poured out on a metal sheet in order to cool.

A yellowish-clear brittle resin having a softening point of 56° C. and an epoxide content of 2.62 epoxide equivalent/kg. is obtained, which represents a reactive B-stage.

The material can be easily pulverised and shows good storage stability and also good flow on melting. It can be converted into an infusible and insoluble crosslinked material of good mechanical properties by heating for example for 1 hour at 190° C. This "B-stage" by pre-condensation is therefore outstandingly suitable for, for example, the manufacture of single-component binders or "prepregs."

EXAMPLE 10

(Manufacture of a B-stage)

931 parts of Δ⁴-tetrahydrophthalic acid diglycidyl ester having an epoxide content of 6.4 epoxide equivalent/kg. (epoxide resin B) are mixed with 138.2 parts of ethyleneurea (corresponding to 0.5 equivalent of NH group per 1 epoxide equivalent) and 0.1 part by volume of 30% strength aqueous sodium hydroxide solution and heated to 155–157° C. with good stirring. After 50 minutes the epoxide content of the reaction mixture has declined to 4.84 epoxide equivalent/kg., after 90 minutes to 3.15 epoxide equivalent/kg. and after a total of 2 hours to 2.80 epoxide equivalent/kg. The reaction is stopped after this time by pouring the resin out on a metal sheet.

A yellowish viscous resin having an epoxide content of 2.80 (theory: 2.79) epoxide equivalent/kg. is obtained, representing a B-stage. It is storage-stable at room temperature and can be converted into an infusible and insoluble moulded material of good mechanical and electrical properties by heating. It is therefore for example suitable for the manufacture of single-component binders of "prepregs."

What is claimed is:

1. A storage-stable hot-curable composition of matter, which comprises (a) a polyepoxide having in its molecule an average of more than one glycidyl group bonded to a hetero-atom or 2,3-epoxycyclopentyl group bonded to a hetero-atom, and (b) a cyclic urea of formula

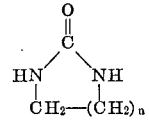

wherein $n$ is 1 or 2, as the curing agent.

2. A composition as claimed in claim 1, which contains ethyleneurea, as the curing agent (b).

3. A composition as claimed in claim 1, which contains 0.5 to 3.0 equivalents of NH groups of the cyclic urea (b) per 1 equivalent of epoxide groups of the polyepoxide (a).

4. A composition as claimed in claim 1, which contains 0.5 to 1.5 equivalents of NH groups of the cyclic urea (b) per 1 equivalent of epoxide groups of the polyepoxide (a).

5. A composition as claimed in claim 1, which contains a polyglycidyl ether of a polyhydride phenol as the polyepoxide (a).

6. A composition as claimed in claim 5, which contains a polyglycidyl ether of 2,2-bis(p-hydroxyphenyl) propane as the polyepoxide (a).

7. A composition as claimed in claim 1, which contains a polyglycidyl ester of a polycarboxylic acid as the polyepoxide compound (a).

8. A composition as claimed in claim 7, which contains the diglycidyl ester of Δ⁴-tetrahydrophthalic acid or of hexahydrophthalic acid as the polyepoxide (a).

9. A storage-stable heat-curable composition of matter which comprises a curable pre-condensate ("B-stage") which is still soluble and fusible, said pre-condensate being made by heating a mixture of (a) a polyepoxide having in its molecule an average of more than one glycidyl group bonded to a hetero-atom or 2,3-epoxycyclopentyl group bonded to a hetero-atom, and (b) a cyclic urea of formula

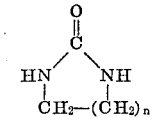

wherein $n$ is 1 or 2 and stopping the reaction before the gelled, infusible and insoluble state is reached.

References Cited

UNITED STATES PATENTS 3,386,956   6/1968   Nawakowski et al.

WILLIAM H. SHORT, Primary Examiner

T. E. PERTILLA, Assistant Examiner

U.S. Cl. X.R.

117—161; 161—184; 260—2, 9, 18, 37, 59, 78.4, 831, 834, 836